United States Patent [19]

Melcher et al.

[11] Patent Number: 4,883,956
[45] Date of Patent: Nov. 28, 1989

[54] METHODS AND APPARATUS FOR GAMMA-RAY SPECTROSCOPY AND LIKE MEASUREMENTS

[75] Inventors: Charles L. Melcher, West Redding; Ralph A. Manente, Monroe; Jeffrey S. Schweitzer, Ridgefield, all of Conn.

[73] Assignee: Schlumberger Technology Corporation, New York, N.Y.

[21] Appl. No.: 149,953

[22] Filed: Feb. 2, 1988

Related U.S. Application Data

[63] Continuation of Ser. No. 812,220, Dec. 23, 1985.

[51] Int. Cl.[4] .............................................. G01T 1/202
[52] U.S. Cl. ..................................... 250/269; 250/270
[58] Field of Search .............................. 250/209, 270; 252/301.4 H

[56] References Cited

U.S. PATENT DOCUMENTS

| | | | |
|---|---|---|---|
| 2,749,446 | 6/1956 | Herzog | 250/256 |
| 3,321,627 | 5/1967 | Tittle | 250/267 |
| 3,461,291 | 8/1969 | Goodman | 250/262 |
| 3,521,064 | 7/1970 | Moran et al. | 250/261 |
| 3,546,512 | 12/1970 | Frentrop | 313/61 |
| 3,665,195 | 5/1972 | Youmans | 250/270 |
| 3,890,501 | 6/1975 | Johnstone | 250/265 |
| 4,012,712 | 3/1977 | Nelligan | 340/18 CM |
| 4,034,218 | 7/1977 | Turcotte | 250/269 |
| 4,048,495 | 9/1977 | Ellis | 250/264 |
| 4,224,516 | 9/1980 | Johnstone | 250/262 |
| 4,317,993 | 3/1982 | Hertzog, Jr. et al. | 250/270 |
| 4,433,240 | 2/1984 | Seeman | 250/256 |
| 4,490,609 | 12/1984 | Chevalier | 250/269 |
| 4,517,459 | 5/1985 | Richter, Jr. et al. | 250/261 |
| 4,647,781 | 3/1987 | Takagi et al. | 250/483.1 |

FOREIGN PATENT DOCUMENTS

| | | | |
|---|---|---|---|
| 2202485 | 8/1973 | Fed. Rep. of Germany | 252/301.4 F |
| P3303166.5 | 9/1983 | Fed. Rep. of Germany | |
| 0005883 | 1/1981 | Japan | 252/301.4 F |

OTHER PUBLICATIONS

Smolin, Yu.I., Tkachev, S. P., "Determination of the Structure of Gadolinium Oxyorthosilicate $Gd_2O_3\cdot SiO_2$", *Soviet Physics–Crystallography*, Vol. 14, No. 1, July–Aug., 1969, pp. 14–16.

Schotanus, P., et al., "Temperature Dependence of $BaF_2$ Scintillation Ligh Yield", *Nuclear Instruments and Methods in Physics Research*, A238, (1985) pp. 564–565.

(List continued on next page.)

Primary Examiner—Janice A. Howell
Assistant Examiner—Richard Hanig
Attorney, Agent, or Firm—Brumbaugh Graves Donohue & Raymond

[57] ABSTRACT

Improved borehold logging methods and apparatus for detecting and measuring photon and other radiation from earth formations. Such radiation may be, for example: natural; generated by a source and modified by interaction with formation constituents; produced during or immediately following interactions between neutron irradiation and formation constituents; or produced by decay of constituents rendered artificially radioactive by prior neutron activation. The radiation is detected by a scintillator and photomultiplier tube, the scintillator comprising one or more crystals containing gadolinium, for example gadolinium orthosilicate doped with cerium. Such a detector provides advantageous operating characteristics, including relatively high detection efficiency and energy resolution and the ability to operate in the borehole environment without special protection against contamination or temperature effects. Depending upon the origin of the radiation to be measured, the crystal may be surrounded with a layer of material for attenuating low-energy gamma radiation, such as lead, and/or a layer of neutron absorbing material such as boron-10. The crystal may be shaped by truncating its corners parallel to the axis of the photomultiplier tube, thereby improving the usage of space and obtaining an improvement in energy resolution.

28 Claims, 9 Drawing Sheets

OTHER PUBLICATIONS

Beard, G. B., Kelly, W. H., Mallory, M. L., "Temperature Dependent Luminescence of CaWO$_4$ and CdWO$_4$", *Journal of Applied Physics*, Vol. 33, No. 1, Jan., 1962, pp. 144–147.

Anan'eva, et al., "Growth of Lanthanide Oxyorthosilicate Single Crystals, and Their Structural and Optical Characteristics", *Transl. Izvestiya Akademii Nauk SSSR, Neorganicheskie Materialy*, Vol. 17, No. 6, June, 1981, pp. 1037–1042.

Catalog "Scintillators", *Harshaw/Filtrol Partnership facilities*, Solon, Ohio.

Dahlbom, M., Mandelkein, M. A., Hoffman, F. J., Ricci, A. R., Batton, J. B., "Hybrid Mercuric Iodide (HgI$_2$)—Gadolinium Orthosilicate (GSO) Detector for Pet.", *IEEE Trans. on Nuclear Science*, Vol. NS32, No. 1, Feb., 1985, pp. 533–537.

Takagi, Kazumasa & Fukazawa, Tokuumi, "Cerium-activated Gd$_2$SiO$_5$ single crystal scintillator", *Appl. Phys. Letters*, Vol. 2, No. 1, Jan. 1, 1983, pp. 43–45.

Tailor, R. C., Nestor, O. H., Utts, B., "Investigation of Cerium-Doped Barium Flouride", *IEEE Nuclear Science Symp. & Nuclear Power Systems Symp. & Exposition*, San Francisco, Oct., 1985, pp. 243–246.

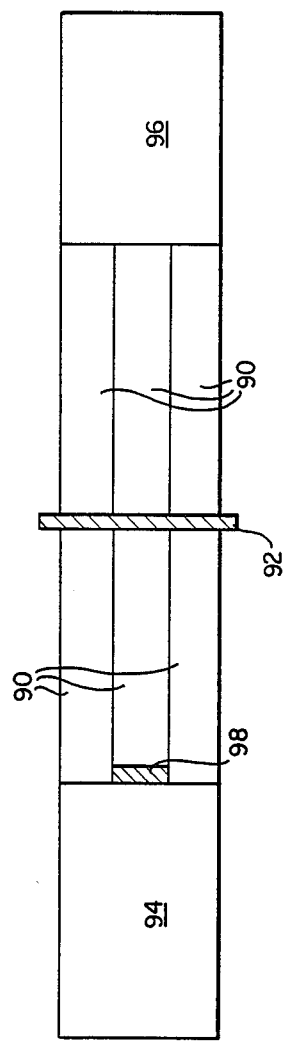

METHODS AND APPARATUS FOR GAMMA-RAY SPECTROSCOPY AND LIKE MEASUREMENTS

This application is a continuation of application Ser. No. 812,220, filed on Dec. 23, 1985.

BACKGROUND OF THE INVENTION

This invention relates to methods and apparatus for gamma-ray spectroscopy and like measurements of high-energy photons in boreholes traversing earth formations.

Borehole logging using detection of high-energy photons such as gamma-rays and X-rays, with or without spectral analysis, is an important technique in the discovery and development of subsurface reserves of hydrocarbons. Typically, after a borehole has been drilled an elongate logging tool or sonde is lowered to the bottom of the borehole on an armored cable containing electrical conductors for transmitting electrical power and signals between surface equipment and the sonde. The sonde is then raised up the borehole by winching the cable, and detectors in the sonde are used to sense high-energy photon radiation either naturally emitted by radioactive elements in the formations (such as uranium, thorium and potassium) or resulting from irradiation with penetrating radiation emitted by a source contained in the sonde.

If a source is provided the radiation may take the form for example of neutrons, gamma rays or X-rays, and may originate from decay of atoms (involving either a nuclear or an atomic transition) in a radioactive material or be generated artificially by an electrically-powered accelerator. Examples of possible sources are cesium-137 which coninuously emits gamma radiation in the course of decaying to form barium, and the neutron accelerator described in U.S. Pat. No. 3,461,291 to Goodman and U.S. Pat. No. 3,546,512 to Frentrop which emits neutrons either continuously or in pulses depending on the manner of operation. The radiation thus emitted by the sonde interacts with the atoms of the materials in the vicinity of the sonde (e.g. the borehole contents and/or the constituents of the formations), and is modified in a manner dependent on the characteristics of those materials. The detectors in the sonde may sense either the scattered and attenuated photon (gamma or X-ray) radiation in the case of a photon source, or gamma radiation induced by interaction with neutrons produced by a neutron source. Yet another possibility is the detection of activation gamma radiation resulting from decay of radioactive isotopes artificially induced in the formation by irradiation with neutrons; such activation radiation typically persists for periods of the order of minutes after irradiation.

Borehole detectors of high-energy photons such as gamma rays and X-rays commonly employ a specially grown scintillation crystal which produces a burst of visible or near-visible photons (i.e. relatively lower energy photons) when a high-energy photon interacts with its constituent atoms. This burst or light flash is sensed by a photomultiplier adjacent the scintillation crystal to produce an electrical signal indicative of the flash intensity, which is dependent upon the energy of the incident high-energy photon.

Parameters of the detected gamma rays or X-rays such as their energy and/or rate of occurrence are measured and the measurements transmitted via the armored cable to the surface equipment to be recorded. Analysis of, for example, the time and/or energy spectrum distributions of the detected high-energy photon radiation enables information about subsurface conditions to be deduced to aid the detection and development of subsurface hydrocarbon deposits.

The environment in a borehole is hostile to electrical and mechanical equipment, involving wet or corrosive surroundings and possibly high pressures and temperatures. consequently a borehole logging sonde must be of rugged design. Furthermore the space in a borehole is very confined—in the case of logging sondes designed to pass through production tubing the outer diameter is limited to 1 11/16 inches (~42.9 millimeters). These requirements impose severe constraints on the materials and construction of a logging sonde. In addition the maintenance and operation of a borehole drilling rig is extremely expensive, so time spent on activities other than actual drilling (e.g. borehole logging) must be minimized.

One particular problem in the design of borehole high-energy photon detectors is the choice of scintillation crystal. This should ideally have several specific properties, such as: a high density to maximize the possibility of interactions between high-energy photons and the scintillator material, and thus the efficiency of detection of such photons traversing the crystal; high effective atomic number to provide a high photo-peak efficiency, that is maximize the possibility of the desired photo-electric interaction and minimize undesirable Compton scattering which reduces gamma ray and X-ray energy and degrades the accuracy of the determination of incoming photon energy; fast decay of the scintillation process following a gamma ray of X-ray interaction and low afterglow; high scintillation light output linearly related to incoming photon energy to provide good energy resolution and accurate energy measurement; high transparency to minimize attenuation of the light flashes by the scintillator material; insensitivity of the scintillation process to temperature changes; inert behavior in the presence of materials typical of the borehole environment, and good mechanical strength; availability in sizes of the order of several centimeters in length and diameter. Many candidate materials for use as borehole scintillators fail to provide one or more of these properties.

The material most commonly used at present for logging applications is sodium iodide doped with thallium. This material has several disadvantages that have imposed undesirable constraints on logging operations: it has a low density, so its detection efficiency is low; it has a slow decay of the scintillation process, limiting the rate at which it can respond to high-energy photon interactions; the afterglow is large and persists for a long time after the interaction of a photon with the crystal; and it is hygroscopic, so it must be enclosed within a hermetically sealed housing. Although sodium iodide has some advantageous characteristics, including a high light output, good energy resolution and availability in relatively large sizes, and its sensitivity to temperature changes can be compensated relatively easily, the use of sodium iodide has restricted logging operations undesirably in terms of low logging speeds, poor measurement statistical reliability and failure of hermetic sealing for example.

Another material that has been investigated recently is bismuth germanate (BFO). This has a much higher density than sodium iodide, a high effective atomic number owing to the presence of bismuth, and it is not hygroscopic. Unfortunately, its light output is considerably lower than that of sodium iodide (around 88% lower) and furthermore the light output drops precipitously with increasing temperature. Hence some kind of thermal stabilization is necessary such as active cooling or enclosing the scintillator in a dewar. Unfortunately, the material in the walls of such a dewar attenuates incoming radiation undesirably, and consumes space thereby decreasing the maximum size of the crystal, which in turn leads to restrictions in logging speed, statistical reliability, etc. This renders the incorporation of BGO in practical slim logging tools very difficult or impossible. In addition the spectrum of its light output is not well matched to common existing photomultiplier tubes, so development of new photomultiplier technology would be required to take full advantage of its desirable properties and offset the effect of its inherently low light output. These problems are made worse by the relatively high refractive index of BGO, which results in a tendency for light to be trapped in the crystal by total internal reflection. Furthermore the scintillation decay time of BGO is even longer than that of sodium iodide, leading to greater problems with pulse pile-up.

It is an object of this invention to provide methods and apparatus for gamma ray spectroscopy and like measurements which alleviates problems associated with the use of scintillation materials in the difficult and hostile environment encountered in borehole logging.

SUMMARY OF THE INVENTION

Accordingly this invention provides apparatus and methods for investigation of subsurface earth formations, using a sonde adapted for movement through a borehole. Depending upon the formation characteristic or characteristics to be measured, the sonde may include a natural or artificial radiation source for irradiating the formations with penetrating radiation such as gamma rays, X-rays or neutrons. Alternatively the sonde may measure the natural radioactive emissions of the formations, in which case no source would be included. Radiation whether natural or resulting from irradiation is detected by the sonde by means of a scintillator containing gadolinium, such as a crystal of gadolinium orthosilicate doped with cerium. Such a scintillator has a higher density than sodium iodide, a much shorter scintillation decay time, a higher effective atomic number and is non-hygroscopic. In addition, and of great importance for logging applications, the variation in its light output with temperature over the range typically encountered in such operations is comparable to that of sodium iodide, rendering additional special precautions against temperature changes unnecessary.

The light produced by the scintillator in response to detected radiation is used to generate a signal representative of at least one characteristic of the radiation and this signal is recorded. Analysis of the signal enables valuable information about the formation, and the presence and producibility of valuable resources such as hydrocarbons to be obtained.

The use of a gadolinium-containing scintillator provides significant advantages in terms of logging tool design and construction and in the speed and accuracy with which logging measurements can be performed. In particular it avoids the need for hermetic sealing and/or temperature control devices, thus simplifying the tool, making it more reliable and releasing space which can be used to house a larger crystal. A specified level of measurement precision can be attained in a shorter time, or greater precision can be achieved in the same time.

BRIEF DESCRIPTION OF THE DRAWINGS

Additional objects and features of the invention will become more apparent upon consideration of the following detailed description of illustrative embodiments of the invention, reference being had to the accompanying drawings in which:

FIG. 9 is a side view of another detector, for use in natural gamma ray logging.

DETAILED DESCRIPTION

A variety of different techniques for borehole gamma-ray spectroscopy and like high-energy photon measurements are known, involving various different origins for the detected radiation and interactions with the borehole and/or formation constituents. The methods and apparatus of the present invention are applicable to all of these techniques and will be described in relation to examples of them. Although particular reference will be made to spectroscopic measurement of formation gamma radiation, it is to be understood that the invention is applicable to detection and measurement with a scintillator of other kinds of photon radiation such as X-rays, and that the term 'high-energy photon' encompasses all photon radiation having energy typical of gamma rays and X-rays. Furthermore the invention is applicable to detection and measurement of such radiation from anywhere in the region of a borehole (e.g. from the fluid contents of the borehole) and not just from the formations surrounding the borehole.

Figure 1:
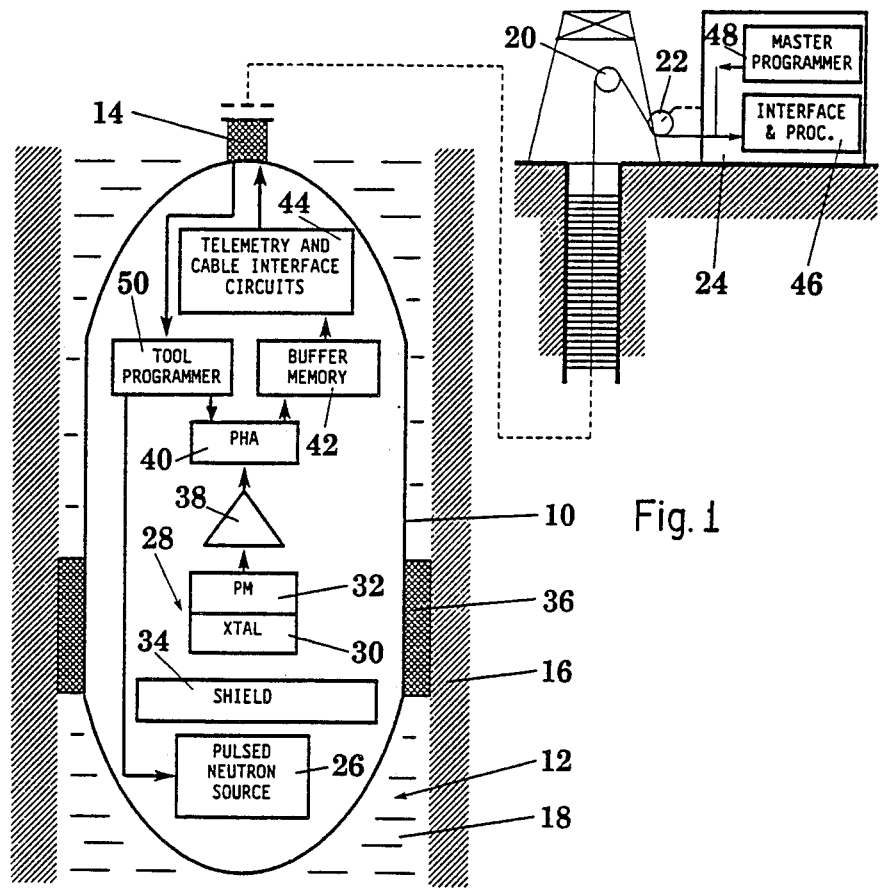
FIG. 1 is a schematic diagram of a sonde forming part of an apparatus in accordance with the invention.

Referring to the drawings, FIG. 1 shows a logging sonde 10 for sensing gamma radiation resulting from bombardment of a formation with high energy neutrons and detecting the energy of the radiation for subsequent spectral analysis. The sonde 10 is suspended in a borehole 12 on an armored multi-conductor cable 14. The borehole 12 traverses a formation 16 and is filled with fluid 18, and may be open as shown or cased. The sonde 10 as described below may be constructed in accordance with U. S. Pat. No. 4,317,993 to Hertzog, Jr. et al, assigned to the assignee of the present application. Other sondes suitable for use in implementing the present invention will occur to those skilled in the art. The sonde 10 is moved in the borehole 12 by paying the cable 14 out and reeling it back in over a sheave wheel 20 and a depth gauge 22 by means of a winch forming part of a surface equipment 24. Usually the logging measurements are actually made while the sonde 10 is being raised back up the borehole 12, although in certain circumstances they may be made on the way down instead or as well.

The sonde 10 includes a pulsed neutron source 26 for producing primary radiation to bombard the formation 16 with fast neutrons as the sonde 10 travels up the borehole 12, and a radiation detector 28 for detecting secondary (gamma) radiation induced thereby in the borehole 12 and the formation 16. The neutron source 26 is preferably of the pulsed accelerator type described in U.S. Pat. No. 3,461,291 to Goodman and U.S. Pat. No. 3,546,512 to Frentrop, both commonly owned with this application. This type of source is particularly suited to the generation of discrete bursts of high energy or fast neutrons, e.g. at 14 MeV, with a controlled duration and repetition rate.

The detector 28 is of a type appropriate to the detection of gamma radiation and the production of an electrical signal corresponding to each detected gamma ray and having an amplitude representative of the energy of the gamma ray. To this end the detector 28 includes a scintillation crystal 30 which is optically coupled to a photomultiplier tube (PMT) 32. Suitable tubes are manufactured by EMR Photoelectric, Princeton, N.J. The crystal 30 comprises gadolinium orthosilicate suitable doped to activate it for use as a scintillator, for example with cerium. The quantity of cerium in terms of number of atoms is typically of the order of 0.1% to 1% of the quantity of gadolinium. Further details of this scintillator material, including the manner of its growth, can be found in a paper entitled 'Cerium-activated $Gd_2SiO_5$ single crystal scintillator' by Kazumasa Takagi and Tokuumi Fukazawa, Appl. Phys. Lett., Vol. 42, No. 1, 1 January 1983, pp. 43-45, and in German patent application No. 33 03 166. Such scintillator crystals are manufactured by Hitachi Chemical Co. Ltd., Tokyo, Japan.

A neutron shield 34 is located between the source 26 and the detector 28 to limit direct bombardment of the detector 28 by neutrons from the source 26, thereby avoiding saturation of the detector 28 by such direct irradiation. In addition, especially in the case of measurement of capture gamma radiation, the sonde 10 may be surrounded by a sleeve 36 impregnated with boron carbide and located in the general vicinity of the source 26 and the detector 28. This sleeve displaces borehole fluid in the region of the detector 28, and absorbs neutrons scattered by the formation towards the detector 28, without significantly attenuating gamma radiation emanating from the formation. The net effect is to reduce the possibility of neutron interactions with the borehole contents and the material of the sonde 10 in proximity to the detector 28 and which would otherwise produce detectable gamma rays constituting an undesirable perturbation of the required gamma ray measurement.

Electrical power for the sonde 10 is supplied via the cable 14 from the surface equipment 24. The sonde 10 includes power conditioning circuitry (not shown) for feeding power at appropriate voltage and current levels to the source 26, the detector 28 and other downhole circuits. These circuits include an amplifier 38 and associated circuitry which receives the output pulses from the PMT 32. The amplified pulses are then applied to a pulse height analyzer (PHA) 40 including an analog-to-digital converter which may be of any conventional type such as the single ramp (Wilkinson rundown) type. Other suitable analog to digital converters may be used for the gamma ray energy range to be analyzed. Linear gating circuits may also be employed for control of the time portion of the detector signal frame to be analyzed. Improved performance can be obtained by the use of additional conventional techniques such as pulse pile-up rejection.

The pulse height analyzer 40 assigns each detector pulse to one of a number (typically in the range 256 to 8000) of predetermined channels according to its amplitude (i.e. the gamma ray energy), and produces a signal in suitable digital form representing the channel or amplitude of each analyzed pulse. Typically the pulse height analyzer 40 includes memory in which the occurrences of each channel number in the digital signal are accumulated to provide an energy spectrum. The accumulated totals are then transferred via a buffer memory 42 (which can be omitted in certain circumstances) to telemetry and cable interface circuits 44 for transmission over the cable 14 to the surface equipment 24.

At the surface the cable signals are received by cable interface and signal processing circuits 46. It will be understood that the circuits 44 and 46 may be of any suitable known construction for encoding and decoding, multiplexing and demultiplexing, amplifying and otherwise processing the signals for transmission to and reception by the surface equipment 24. Appropriate circuits are described, for example, in U.S. Pat. No. 4,012,712 to Nelligan.

The operation of the sonde 10 is controlled by signals sent downhole from a master programmer 48, located in the surface equipment 24. These signals are received by a tool programmer 50 which transmits control signals to the neutron source 26 and the pulse height analyzer 40.

The surface equipment 24 includes various electronic circuits used to process the data received from the downhole equipment, analyze the energy spectrum of the detected gamma radiation, extract therefrom information about the formation 16 and any hydrocarbons that it may contain, and produce a tangible record or log of some or all of this data and information, for example on film, paper or tape. These circuits may comprise special purpose hardware or alternatively a general purpose computer appropriately programmed to perform the same tasks as such hardware. Details of such analysis form no part of this invention and will not be described here, but may be found for example in U.S. Pat. No. 3,521,064 to Moran et al.

As noted above, the detector 28 includes the scintillation crystal 30 of doped gadolinium orthosilicate. Many different crystal materials have been investigated over the years in an attempt to find a material with an optimum combination of properties for photon detection in a variety of applications. These investigations have met with limited success at best. In view of the especially severe combination of requirements which must be met in the case of a borehole photon detector, it has been even more difficult to find a scintillator optimally suited to the demands of borehole logging.

Up to the present the scintillator most commonly used in borehole photon logging has been one of the first such materials discovered, namely sodium iodide doped with thallium—NaI(Tl). Although this has the advantages of relatively very high light output and good energy resolution, it also has significant disadvantages. In particular its low density results in a poor efficiency of detection of photons arriving at the crystal. This is serious since the radiation interactions of interest in the formation 16 and the crystal 30 are statistical in nature, so a certain minimum number of interactions must be recorded at any given location in the borehole 12 to reduce the influence of statistical fluctuations and ensure the reliability of the resulting measurements and the information derived therefrom. Low detection efficiency entails prolonging the measurement time to achieve acceptable numbers of detected interactions, thereby limiting the speed at which the sonde 10 can be drawn up the borehole and possibly requiring stationary measurements. Furthermore, the long scintillation decay time of sodium iodide limits the maximum rate at which interactions can be distinguishably detected, so the low detection efficiency cannot be offset simply by increasing the neutron output of the source 26. Additionally, sodium iodide is hygroscopic, so it must be enclosed in a hermetically sealed housing, which requires space that would otherwise be available to permit use of a larger crystal 30.

Another crystal which has been proposed for borehole photon logging is bismuth germanate (BGO). Although this is non-hygroscopic, has a much higher density than sodium iodide and contains bismuth which yields a high effective atomic number, it has other properties which pose considerable problems for borehole logging applications. Thus its light output is only 12% of that of sodium iodide, resulting in much poorer energy resolution than sodium iodide. Exposure to visible light is liable to cause damage to the crystal, resulting in further reduction in the resolution and light output; although this is reversible by heating or prolonged storage it is a practical inconvenience. BGO has a relatively high refractive index, resulting in a tendency for light to be trapped within the crystal by total internal reflection and thus making efficient extraction of the light very difficult. Furthermore its light output is strongly temperature sensitive, dropping at a temperature of 100 degrees C. to about one-quarter of the output at room temperature.

These problems are exacerbated if common types of photomultipliers are to be used, since the spectrum of the light output of BGO is not well matched to the spectral response of such photomultipliers. Consequently, effective use of BGO in the borehole logging environment would require protection of the BGO crystal against temperature increases and development of a special photomultiplier with a spectral response optimized for use with BGO. Temperature stabilization, for example by means of a dewar, involves enclosing the crystal in material which will tend to attenuate the incoming gamma radiation. The space required for this additional material will also reduce the space available for the crystal, thereby limiting its size even more than is normally the case in borehole logging tools. In certain cases these size constraints can make impossible the construction of a practical tool capable of making statistically reliable measurements sufficiently fast to be commercially acceptable.

Figure 2:
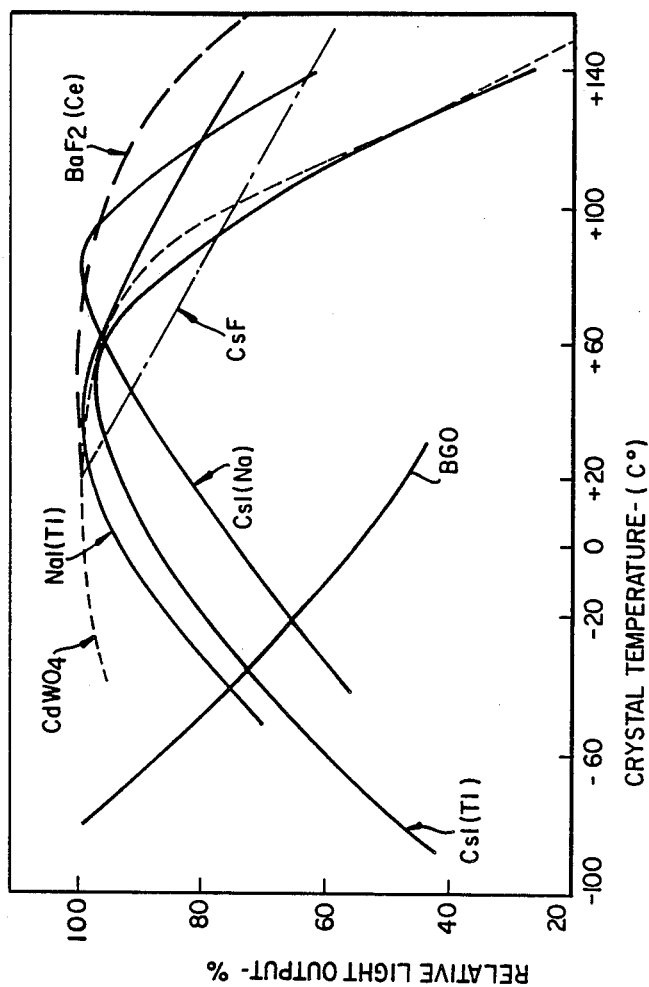
FIG. 2 is a graph showing variation of light output with temperature of several scintillator materials.

The relationship between light output and temperature for some well-known scintillator materials is shown in FIG. 2. The curves in solid line are data for NaI(Tl), BGO, and cesium iodide doped with sodium or thallium, published by Harshaw/Filtrol Partnership, Solon, Ohio; the dashed line is based on data for barium fluoride doped with cerium, presented at the IEEE Nuclear Science Symposium and Nuclear Power Systems Symposium and Exposition, October 1985, San Francisco, Calif., by R. C. Tailor, O. H. Nestor and B. Utts of Harshaw/Filtrol Partnership; and the dotted and broken dashed lines are based on data obtained by one of the inventors hereof for cadmium tungstate and cesium fluoride respectively. It should be noted that these curves are normalized so that 100% light output occurs at some arbitrarily chosen temperature, such as room temperature or the temperature of maximum output. Thus caution must be used in making quantitative comparisons between curves. Nonetheless it is evident that the light output of many of these scintillator materials declines markedly with temperature. Even for those which maintain their light output at high temperatures relative to low temperatures, such as NaI(Tl), CsI(Na), CsF and BaF2(Ce), there are serious problems such as relatively low density (CsI, NaI), very low absolute light output (CsF, BaF2(Ce)), hygroscopic nature (CsI, NaI, CsF) and/or poor spectral match to existing photomultiplier tubes (CsI(Tl)).

The above-noted characteristics of various scintillator materials have inevitably involved the tedious, expensive and time-consuming process of fabricating crystals of each material (as well as many others that have ultimately shown no significant scintillation activity) and then experimentally measuring the properties of interest. There is no known way of predicting the scintillation properties and their variations for any given material in advance.

Recent research by the inventors hereof has revealed that gadolinium orthosilicate doped with, for example, cerium is especially well suited to use in borehole photon logging applications. It has a density similar to that of BGO and a moderately high effective atomic number owing to the presence of gadolinium. Its light output is about 18% that of sodium iodide, and thus higher than BGO, using existing photomultiplier tubes, and the spectrum of this output is better matched to the spectral response of such tubes than that of BGO. It has a moderate refractive index, facilitating extraction of light. The decay time of the scintillation process in cerium-doped gadolinium orthosilicate is very short, of the order of 70 nanoseconds, and the material is not hygroscopic and not susceptible to damage by exposure to visible or near-visible light.

Figure 3:
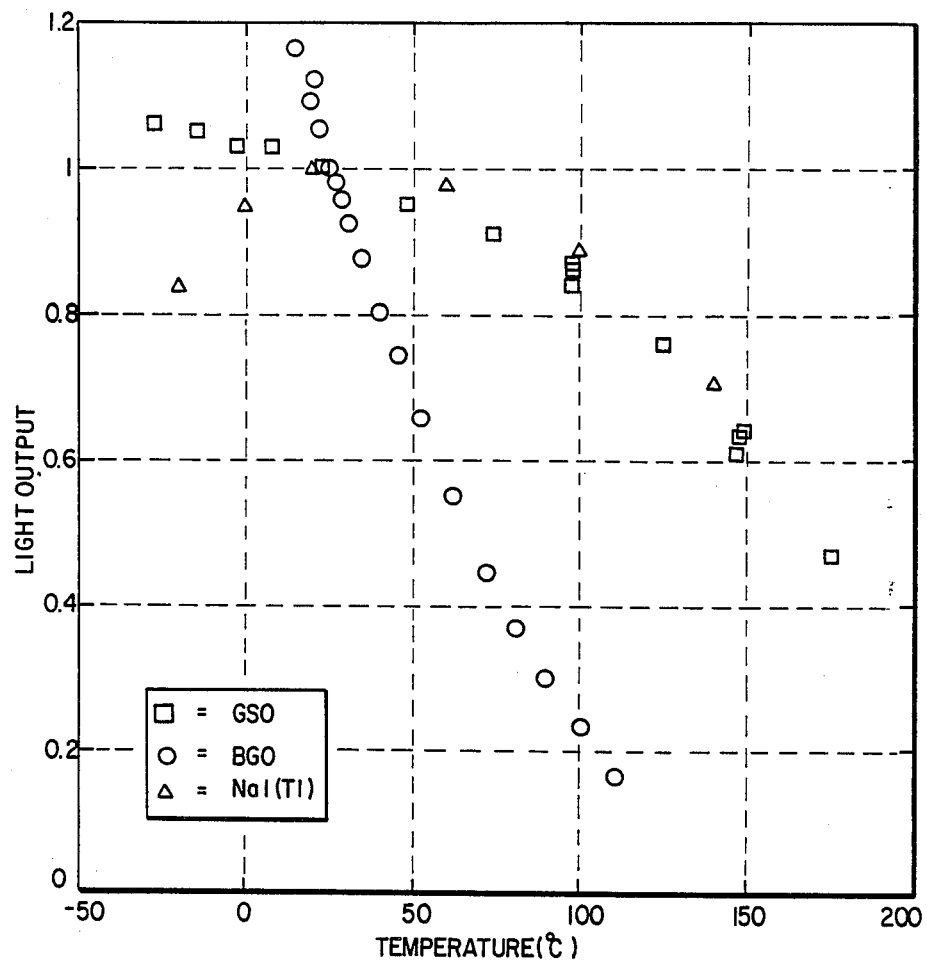
FIG. 3 is a graph showing variation of light output with temperature of three scintillator materials.

In addition, measurements made in the course of work by the inventors at the laboratory of the assignee hereof have shown that the scintillation process in cerium-doped gadolinium orthosilicate has a relatively low sensitivity to temperature changes, thereby rendering it a suitable candidate for use in logging applications where high temperatures can be a significant problem. FIG. 3 is a graph derived from these measurements and showing the change with temperature in the light output of NaI(Tl), BGO and cerium-doped gadolinium orthosilicate. In this figure, the measurements for each material have been normalized so that the light output has a value of unity at a temperature of 25 degrees C. It can be seen that although the light output of cerium-doped gadolinium orthosilicate does drop with increasing temperature, it does so in a manner comparable to NaI(Tl), and is much less sensitive to temperature than BGO. Thus, at a temperature of 150 degrees C. the light output is still 60% of that at 25 degrees C. whereas at 100 degrees C. the light output of BGO has already dropped to only 20% of its output at 25 degrees C.

Gadolinium orthosilicate does have some characteristics that would preferably not be present in a photon logging scintillator: it has a lower light output than NaI(Tl); it cleaves easily along the (100) plane so there is a possibility of fracture in the event of severe shock, but it is believed that this risk is not significantly greater than for sodium iodide and can therefore be countered by appropriate mounting; the presence of gadolinium results in the generation of gamma rays within the crystal itself upon irradiation with neutrons, but this can be reduced or eliminated by the use of appropriate neutron shielding around the crystal, or alternatively the resulting signal can be treated as a background signal and removed during processing by the surface equipment 24.

Figure 4:
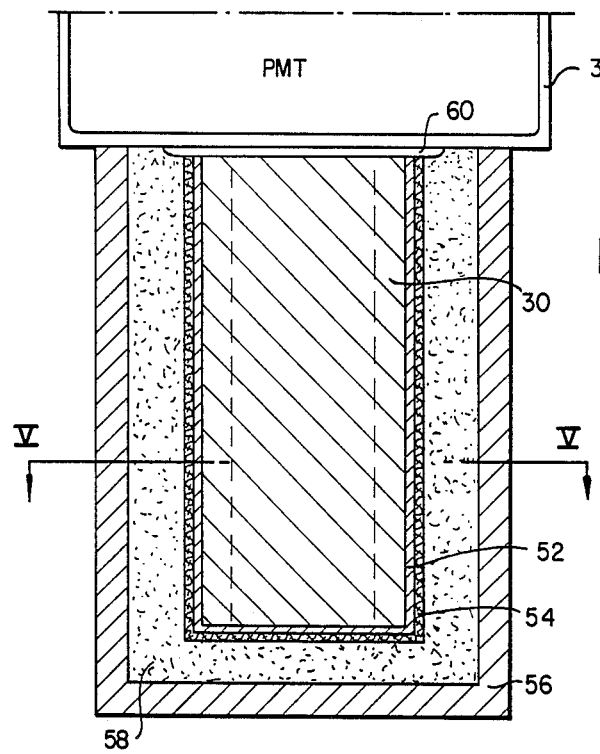
FIG. 4 is a sectional view of a detector forming part of the sonde of FIG. 1.
Figure 5:
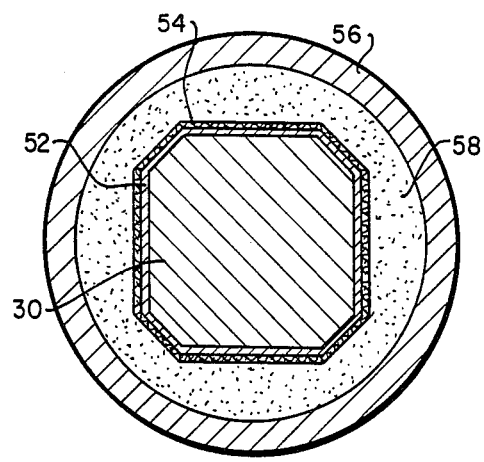
FIG. 5 is a sectional view of the detector taken along the line V—V of FIG. 4.

Referring to FIGS. 4 and 5 which show the detector 28 in more detail, the gadolinium orthosilicate crystal 30 is covered with a reflective tape, foil, paper, powder or paint 52 in a manner known to those skilled in the art to prevent loss of scintillation light through the surface of the crystal. Preferably a thin layer 54 of a low energy gamma ray absorber, such as lead sheet, is then wrapped around the material 52 in order to provide screening against low energy gamma rays (below 1 MeV) which would contaminate the measured spectrum undesirably. Alternative materials include tungsten or a tungsten alloy, depleted uranium or bismuth.

The wrapped crystal is enclosed within a cylindrical housing 56 made of, for example, aluminum or a plastic such as polymethyl methacrylate. The space between the lead sheet 54 and the housing 56 is filled with, for example, boron-10 powder 58 in order to provide neutron shielding as described above, and also a convenient transition from the generally angular shape of the crystal 30 to the circular shape of the housing 56. The powder 58 can also provide a measure of protection for the crystal 30 against the effects of shock. Alternative materials to boron-10 include lithium-6, boron carbide or an artificial isotope decaying by emission of beta particles or other radiation which will be absorbed by the lead sheet 54. Typically the sheet 54 could be approximately two millimeters thick, as could the layer of boron-10 powder 58 at its thinnest point. The thickness of boron-10 is chosen to provide an effective microscopic thermal neutron capture cross-section of at least 100 barns. The crystal 30 is optically coupled to the face of the PMT 32 by means of an optical grease or cement 60 in a manner well known to those skilled in the art.

Figure 6:
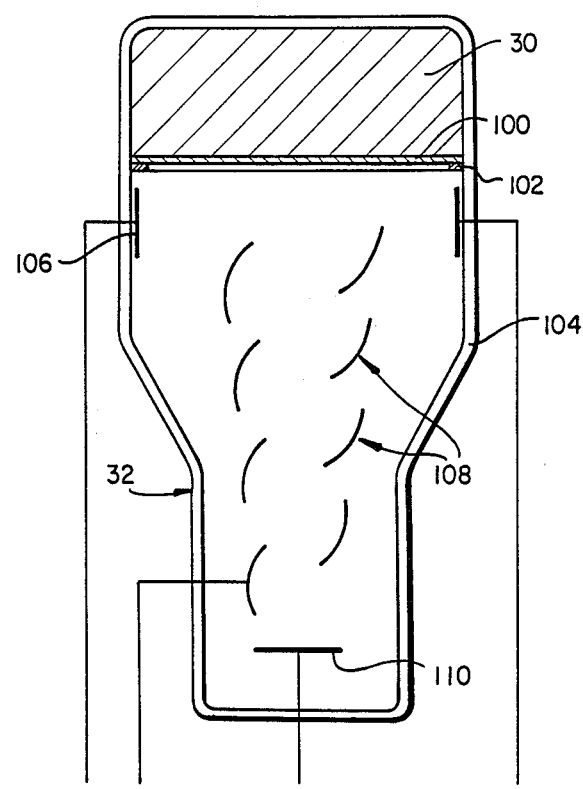
FIG. 6 is a schematic sectional view of another form of detector.

Alternatively the crystal 30 could be made integral with the PMT 32, as shown schematically in FIG. 6. Referring to FIG. 6, the PMT photo-cathode 100 (for example a bi-alkali material) is formed by deposition on one face of the crystal 30, followed by a ring electrode 102. The crystal 30 is then sealed within the envelope 104 of the PMT 32 together with a focus electrode 106, dynode structure 108 and anode 110. Instead of being enclosed the crystal 30 could be fused to the periphery of one end of the envelope 104 so that the crystal 30 closes the envelope 104 at that end.

The complete detector 28 is mounted within the sonde 10 in any convenient known manner, preferably including protection against shock induced damage of the crystal 30.

Figure 7:
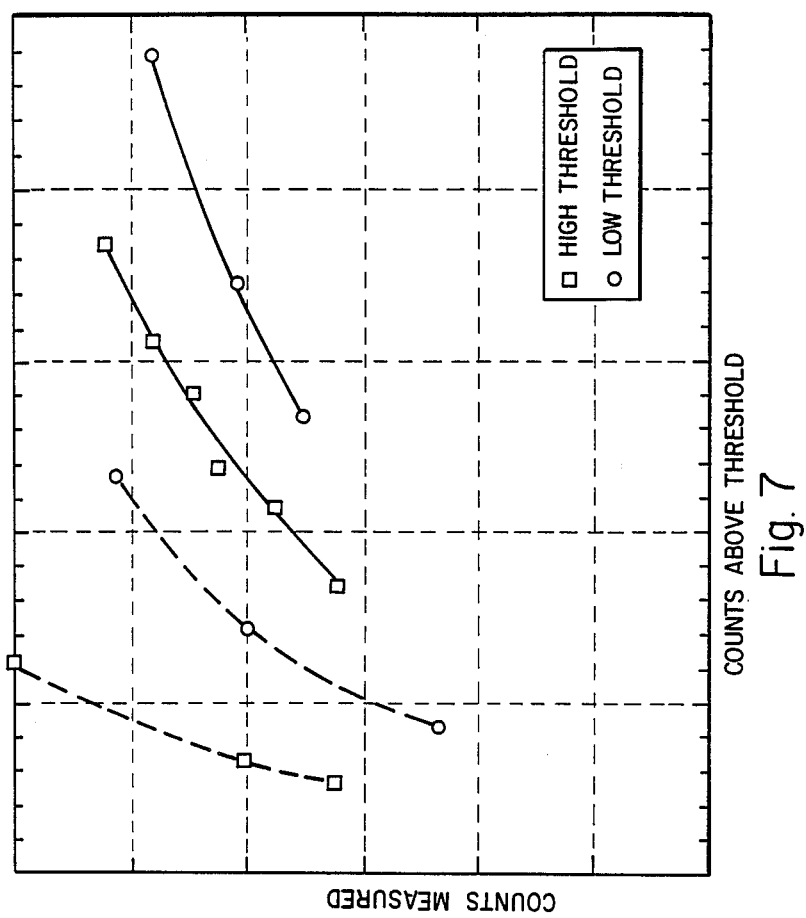
FIG. 7 is a graph illustrating the effect of incorporating a layer of lead in the detector.

The low energy gamma rays which are blocked by the lead sheet 54 arise both from interactions within the formation and also from neutron interactions with boron-10 atoms in the powder layer 58. The effect of the lead sheet 54 is illustrated in FIG. 7 which shows gross inelastic gamma ray events occurring above a predetermined energy threshold along the ordinate and gross inelastic events actually measured in a selected higher energy region along the abscissa, for two different energy thresholds, with the lead sheet 54 (dashed line) and without it (solid line). It can be seen that with the lead sheet 54 the quantity of events measured is higher for a given number of events occurring, because low energy gamma rays that would otherwise cause pulse pile-up rejection of acceptable higher energy events are being absorbed by the lead sheet 54.

The crystal 30 is shown in FIGS. 4 and 5 as being non-cylindrical since crystals of gadolinium orthosilicate are readily manufactured in the form of a right parallelepiped but not, it is believed, in cylindrical form. However, the crystal 30 is also shown as being truncated along the four edges parallel to the common axis of the crystal 30 and the PMT 32, to produce a generally octagonal cross-section. As well as conforming the crystal 30 more closely to a cylindrical shape, it has been found, unexpectedly, that this produces an improvement in the energy resolution of the crystal 30. Thus, in one practical example, the full-width half-maximum resolution at 662 keV improved by approximately 2% of that energy as a result of truncation in this manner, and in another example the resolution improved by 1%. It is envisaged that other polygonal shapes could be used, either regular or irregular, to improve resolution in this way.

In the event that a single large crystal of the desired size is not available, it is possible to assemble a composite crystal from several smaller pieces. It has been found that in this case it is preferable to stack the pieces side by side against the face of the PMT 32, so that each piece has one face adjacent the PMT 32 to provide a direct light path to the PMT 32. In addition, the pieces should be arranged to supply similar individual light outputs to the PMT 32, for example by selection of matched crystals or by insertion of appropriate attenuating filters such as smoked glass between the PMT 32 and any crystal having a higher light output.

It is possible that the resistance of the crystal 30 to mechanical shock can be enhanced, at least for certain directions (e.g. transverse to the axis of the sonde 10), by appropriate choice of the orientation of the cleavage plane of the crystal lattice within the body of the crystal 30. Thus, for example, the (100) plane may be arranged to be parallel to the axis of the sonde 10 when the detector 28 is mounted therein.

Figure 8:
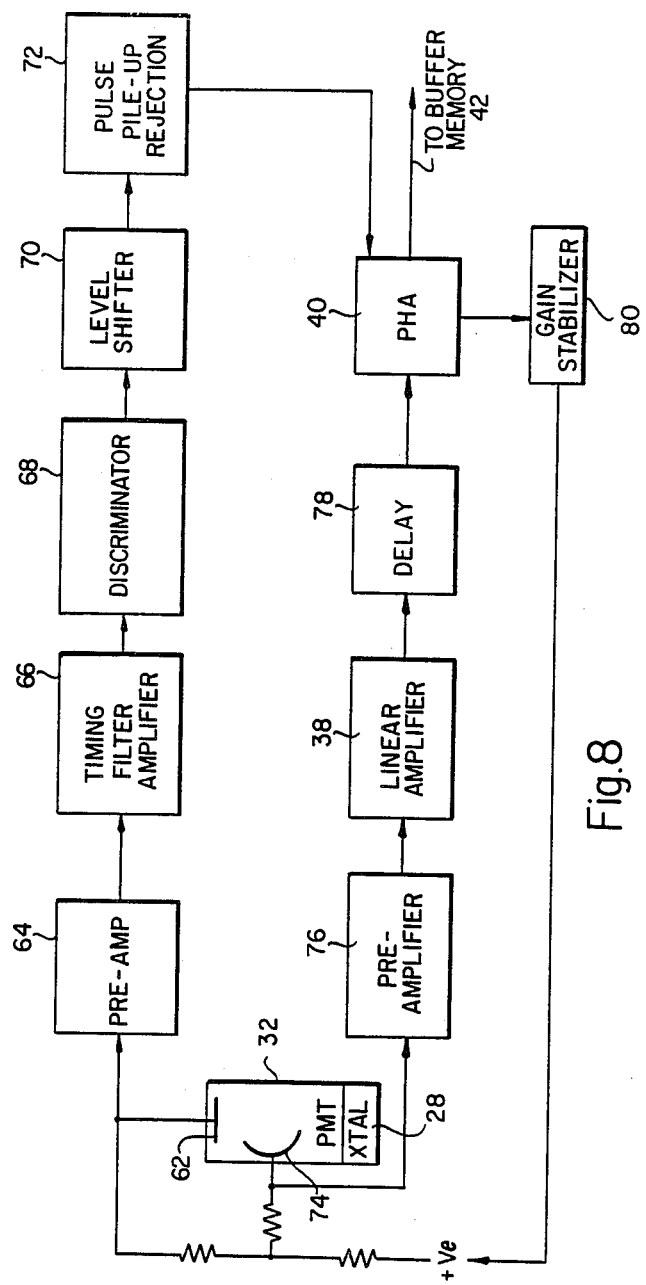
FIG. 8 is a block schematic diagram of circuitry associated with the detector.

FIG. 8 shows in block schematic form exemplary circuitry associated with the amplifier 38 of FIG. 1 for processing the pulses from the PMT 32 and supplying them to the pulse height analyzer 40. This circuitry is arranged to process the pulses more rapidly than typical circuits employed with sodium iodide scintillators, thereby taking advantage of the higher count rate that is made possible by the characteristics (such as the fast scintillation decay) of cerium-doped gadolinium orthosilicate. Thus, referring to FIG. 8, a first signal is taken from the anode 62 of the PMT 32 and supplied via a preamplifier 64 and a timing filter (fast) amplifier 66 to a discriminator 68 having a low energy threshold. Any pulse received from the PMT anode 62 above this energy is passed to a level shifter 70 which in turn feeds a pulse pile-up rejection circuit 72.

Another signal is taken from a dynode 74 towards the end of the dynode chain in the PMT 32 and supplied via a preamplifier 76 to the amplifier 38 (a linear amplifier) having a time constant of the order of a few hundred nanoseconds. This time constant is significantly shorter than that conventionally used with sodium iodide detectors, so as to avoid any electronic limitation on the count rate capability of the system. This amplifier in turn supplies a delay circuit 78 providing an appropriate delay to synchronize with the pulse pile-up rejection circuitry, and the circuit 78 feeds the delayed pulse to the PHA 40, unless the PHA 40 is inhibited by the rejection circuit 72 in response to detection of a pulse pile-up condition. As well as the energy spectrum output signal the PHA 40 supplies a signal to stabilize the energy/voltage relationship of the system, for example to a gain stabilizer 8 which controls the voltage supply of the PMT 32 to stabilize its gain.

The connection arrangement to the PMT 32 and the time values indicated are chosen to take advantage of the inherent fast scintillation decay of cerium-doped gadolinium orthosilicate. Thus, the circuitry is able to identify and reject signals for overlapping scintillation events occurring down to as little as 100 nanoseconds apart. Spectra have been obtained with the circuitry illustrated in FIG. 8 at much higher count rates than are possible using sodium iodide without compromising the desired spectral characteristics. Those skilled in the art will be aware of the design and construction of the circuitry shown in FIG. 8 without further details being provided.

The figure of 18% light output relative to NaI(Tl) given above is for a typical existing photomultiplier tube (a Hamamatsu type R878 having a bi-alkali photo-cathode). Appropriate choice of photo-cathode material for the tube to match more closely the spectrum of the light produced by doped gadolinium orthosilicate would increase this figure, as would other steps to maximize the efficiency of conversion of photons to electrons and the transfer of the electrons from the photo-cathode to the first dynode.

As mentioned earlier, doped gadolinium orthosilicate can be used in any borehole logging application involving the detection of photon radiation by means of a scintillator. It is advantageous because neither a hermetically-sealed enclosure nor provision for temperature stabilization (such as a dewar) are required. Thus attenuation of incoming photon radiation (especially at low energy) is reduced, which is beneficial where, for example, low energy gamma rays are of interest. Also space is made available to permit a larger crystal to be used. Thus in a 42.9 millimeter diameter tool (typical inside diameter=37.6 mm), a square crystal occupying at least ⅓ the interior cross-sectional area of the sonde is feasible, and with a cylindrical crystal at least ½ this area. The crystal area relataive to the area A of the sonde interior is given by the relationship $2*(A/pi+t\ 2-2*SQR(A/pi)*t)/A$ where t is the total thickness of the layers 52, 54 and 58 between the crystal 30 and the interior wall of the sonde 10, SQR indicates a square root and 2 indicates a square. A crystal no more than 100 millimeters in length and a width of at least 1/5 the crystal length are feasible.

As noted earlier, the scintillation process in doped gadolinium orthosilicate decays rapidly. The decay time decreases with temperature. Thus, if a particularly fast decay is desired it is possible to include a heating element adjacent the crystal (e.g. wrapped around it) to maintain it at a predetermined minimum temperature, e.g. above 20 degrees C. The resulting reduction in light output this causes may sometimes lead to a deterioration in statistical reliability per unit count, but this can, if desired, be offset by operating the source 26 at a higher rate of radiation output.

At higher energies a higher count rate can be used than with sodium iodide, so a more reliable measurement can be obtained or the same statistical reliability can be attained in a shorter time. The high density and effective atomic number of gadolinium orthosilicate permit practical operation within more confined space constraints than at present as in, for example, logging through production tubing. Consequently it makes possible a practical measurement of the cabon/oxygen ratio of a formation with a tool such as that described above and sized for operation through such tubing.

Another type of logging tool which uses a pulsed neutron source and a gamma detector measures the decay time of a population of neutrons as they are thermalized and captured by formation nuclei, as described in U.S. Pat. Nos. 3,890,501 and 4,224,516 both to Johnstone. In this case the lead layer 54 could be made thinner or even omitted altogether to allow detection of lower energy gamma radiation. With doped gadolinium orthosilicate presently-used count rates can be maintained with less pile-up occurring; alternatively a higher count rate can be used to yield improved statistical reliability. The fast decay time of cerium-doped gadolinium orthosilicate helps to provide an improved signal in this situation. Thus, the source could be run at a rate which with a typical source/detector spacing and crystal size attainable with doped gadolinium orthosilicate could yield an instantaneous rate of scintillation events in the crystal of more than 200,000 per second.

Another measurement for which doped gadolinium orthosilicate can be used involves the irradiation of the formation with gamma rays rather than neutrons, to enable measurement of the bulk density and effective atomic number of the formation, as described in U.S. Pat. No. 3,321,627 to Tittle and U.S. Pat. No. 4,048,495 to Ellis. For this measurement the source 26 could be made of cesium-137 and the layer of boron-10 powder 58 can be omitted, since there is no irradiation with neutrons which could result in production of gamma rays within the crystal 30. Furthermore, the lead layer 54 would be omitted, since it is desired to detect relatively low energy gamma rays in this case. A particular version of this technique in which doped gadolinium orthosilicate could be advantageously applied is the collimated detection of singly scattered gamma rays, as described in U.S. Pat. No. 4,034,218 to Turcotte.

Similarly the lead and boron would be omitted in applying doped gadolinium orthosilicate to the measurement of natural gamma radiation from formation constituents such as potassium, thorium and uranium, as described in U.S. Pat. No. 2,749,446 to Herzog and U.S. Pat. No. 4,433,240 to Seeman. Obviously the source 26 and shield 34 would also not be present. Such measurements are made not only to permit spectral analysis to determine the concentrations of these elements, but also to record the aggregate intensity of gamma ray emission with depth as an aid to depth correlation during other logging and production operations. Doped gadolinium orthosilicate is especially useful in this latter case since a given level of gamma ray sensitivity can be attained with a smaller, and especially shorter, crystal. This permits an improved depth resolution to be obtained for a given level of statistical reliability of the measurement, and facilitates construction of tools whose dimensions impose severe space constraints. The absence of a source in natural gamma ray logging also facilitates the arrangement shown schematically in FIG. 9, in which the scintillator comprises several crystals 90 arranged side by side as mentioned above, and also in two layers. Two PMT's 94 and 96 are provided, each adjacent an end of a respective layer of crystals 90, and their output signals are combined by summing the spectra derived from those signals. In this way the crystal volume is increased without requiring larger single crystals. Depending upon the required nature of the measurement, a screen 92 of appropriate absorbing material may be included between the layers to prevent scintillation light in one layer from crossing to the other layer, and/or to prevent gamma rays being partially detected in one layer and then scattering into the other layer. A filter is included at 98 for matching the light output of the crystals as described earlier.

Yet another use of doped gadolinium orthosilicate as a borehole logging scintillator is in the analysis of well fluids by means of photon (X-ray) irradiation, as described in U.S. Pat. No. 4,490,609 to Chevalier. Again in this case the boron-10 layer 58 and, typically, the lead layer 54 would be omitted. Another way of applying doped gadolinium orthosilicate to the detection at least of X-rays would be in the form of an array of (possibly relatively small) suitably shielded crystals 30 and associated photo-detectors 32 extending around and/or along the sonde 10.

Doped gadolinium orthosilicate can also be used to detect gamma radiation arising from activation of formation constituents by irradiation with neutrons to produce unstable radioactive isotopes; this radiation typically persists for minutes after the irradiation is effected. An example of this technique using a californium-252 source is described in U.S. Pat. No. 3,665,195. In this case the crystal 30 typically does not require the layer 58 to provide shielding against neutron irradiation, since the distance between the neutron source and the crystal 30 is relatively large. The inclusion of the lead layer 54 depends on the envisaged measurement characteristics, such as the minimum gamma ray energy required to be detected and the extend of pulse pile-up due to low energy gamma rays.

Thus there has been described and illustrated herein methods and apparatus in accordance with the present invention for borehole gamma ray spectroscopy and like high-energy photon measurements. While particular embodiments of the invention have been described, it is not intended that the invention be limited thereby. Thus, it is envisaged that the crystal 30 could be made of gadolinium orthosilicate doped with materials other than cerium and well known to those skilled in the art. Also the scintillation light may be detected with photodetectors other than photo-multiplier tubes.

It is also envisaged that doped gadolinium orthosilicate can be used to detect other forms of penetrating radiation than high-energy photons, such as for example neutrons. In this case the crystal could be shielded with tungsten or other gamma ray absorbing material to reduce its effective sensitivity to gamma radiation, and its size could be restricted to the same end. A further possibility is the use of the same crystal to detect both neutrons and photons.

Therefore it will be apparent to those skilled in the art that various changes and modifications may be made to the invention as described without departing from the spirit and scope of the appended claims.

We claim:

1. Apparatus for investigation of subsurface earth formations, comprising:
    a sonde adapted for movement through a borehole;
    detector means carried by said sonde for detecting radiation and including a gadolinium orthosilicate scintillator; and
    means coupled to said detector means for generating and recording a signal representative of at least one characteristic of radiation detected by said detector means.

2. The apparatus of claim 1, wherein said scintillator comprises a plurality of crystals.

3. The apparatus of claim 1, wherein said plurality of crystals are arranged to provide similar light output characteristics.

4. The apparatus of claim 3, wherein said crystals are selected to have matched light output characteristics.

5. The apparatus of claim 3, wherein said detector means includes filter means to match the light output of said crystals.

6. The apparatus of claim 2, wherein said detector means includes means for detecting scintillation light produced by said scintillator and each of said plurality of crystals has a face adjacent said light detecting means.

7. the apparatus of claim 1, wherein said detector means includes means for detecting scintillation light produced by said scintillator and said scintillator is integral with said light detecting means.

8. The apparatus of claim 1, wherein said signal generating and recording means includes pulse pile-up rejection means for rejecting signals corresponding to two or more superimposed scintillation events ocurring within at least 100 nanoseconds of each other.

9. A borehole photon logging scintillation detector comprising:
    a crystal of cerium-doped gadolinium orthosilicate having a polygonal cross-section;
    a photomultiplier tube having a transparent face disposed adjacent a surface of said crystal;
    an optical coupling medium between said photomultiplier tube face and said crystal surface;
    a layer of light reflective material covering said crystal except for said face;
    a layer of photon absorbing material around said crystal for attenuating photons having an energy below approximately 1 MeV;
    a layer of neutron absorbing material around said crystal and having a capture cross-section of at least 100 barns; and
    a housing around said crystal and said layers.

10. Apparatus for investigation of subsurface earth formations, comprising:
    a sonde adapted for movement through a borehole;
    neutron source means for irradiating material in the region of said borehole with neutrons capable of interactions with said material resulting in radiation having characteristics carrying information about said material;
    detector means carried by said sonde for detecting radiation, said detector means including a gadolinium orthosilicate scintillator and a layer of boron-10 in the order of two millimeters in thickness for absorbing neutrons; and
    means coupled to said detector means for generating and recording a signal representative of at least one characteristic of radiation detected by said detector means.

11. For use in a sonde for investigating subsurface earth formations while moving through a fluid filled borehole traversing said earth formations and subjected to moisture and temperature variations during said movement, detector means adapted to be enclosed within and carried by said sonde, said detector means including a gadolinium orthosilicate scintillator substantially unaffected by the moisture in said borehole and having a variation in sensitivity with temperature over a range from 20 to 150 degrees centigrade comparable to that of thallium-doped sodium iodide, said detector means being responsive to radiation impinging on said scintillator to produce an output indication, and means coupled to said detector means and responsive to said output indication for generating and recording a signal representative of at least one characteristic of said impinging radiation.

12. An improved detector for radiatin emanating from materials in the region of a fluid-filled borehole traversing earth formations, said detector adapted to be carried in a sonde for movement through said borehole, said detector comprising:

a scintillator responsive to radiation from said formations to produce a light output, said scintillator comprising a cerium-doped crystal of gadolinium orthosilicate substantially unaffected by moisture and having a variation in sensitivity with temperature over a range from 20 to 150 degrees centigrade comparable to that of thallium-doped sodium iodide; and means responsive to said light output to produce an electrical signal.

13. The detector of claim 12 wherein said means responsive to said light output comprises a photomultiplier tube.

14. The detector of claim 13 wherein said scintillator and said photomultiplier tube are enclosed within a common envelope.

15. Apparatus for investigation of subsurface earth formations comprising:

a sonde adapted for movement through a borehole;

detector means carried by said sonde for detecting radiation and including a gadolinium orthosilicate scintillator;

means for rendering said scintillator selectively responsive to a desired type of radiation; and means coupled to said detector means for generating and recording a signal representative of at least one characteristic of radiation detected by said detector means.

16. The apparatus of claim 15 above wherein said means for rendering said scintillator selectively responsive comprises a layer of absorbing material selected from the group comprising lead, tungsten, tungsten alloy, depleted uranium and bismuth.

17. The apparatus of claim 15 above wherein said means for rendering said scintillator selectively responsive comprises a layer of absorbing material selected from the group comprising boron-10, lithium-6, boron carbide and an artificial isotope.

18. Apparatus for investigation of subsurface earth formations comprising;

a sonde adapted for movement through a borehole;

detector means carried by said sonde for detecting radiation and including a single crystal gadolinium orthosilicate scintillator of generally cylindrical shape; and means coupled to said detector means for generating and recording a signal representative of at least one characteristic of radiation detected by said detector means.

19. Apparatus for investigation of subsurface earth formations comprising:

a sonde adapted for movement through a borehole;

detector means carried by said sonde for detecting radiation and including a gadolinium orthosilicate scintillator;

said scintillator being substantially exposed to and unprotected from the temperatures encountered in said borehole; and means coupled to said detector means for generating and recording a signal representative of at least one characteristic of radiation detected by said detector means.

20. The apparatus of claim 19 above, wherein said scintillator is cerium doped gadolinium orthosilicate.

21. The apparatus of claim 19 above, wherein said scintillator is a single crystal oriented with its (100) crystal plane substantially parallel to the longitudinal axis of said sonde.

22. Apparatus for investigation of subsurface earth formations comprising:

a sonde adapted for movement through a borehole;

source means carried by said sonde for irradiating material in the region of said borehole with penetrating radiation capable of interactions with said material resulting in radiation having characteristics carrying information about said material;

detector means carried by said sonde for detecting radiation and including a gadolinium orthosilicate scintillator;

means for rendering said scintillator selectively responsive to a desired type of radiation; and means coupled to said detector means for generating and recording a signal representative of at least one characteristic of radiation detected by said detector means.

23. The apparatus of claim 22 above wherein said source means comprises a source of neutrons and said scintillator is rendered selectively responsive to gamma rays.

24. The apparatus of claim 22 above wherein said source comprises a source of neutrons and said scintillator is rendered selectively responsive to neutrons.

25. The apparatus of claim 22 above wherein said source means comprises a source of photons and said scintillator is rendered selectively responsive to photons.

26. A method of investigating subsurface earth formations comprising the steps of:

moving a sonde carrying detector means including a gadolinium orthosilicate scintillator through a borehole in said formations;

detecting radiation from material in the region of said borehole with said detector means; and generating and recording signals representative of at least one characteristic of radiation detected with said detector means.

27. The method of claim 26 above, further comprising rendering said scintillator responsive to a predetermined type of radiation.

28. The method of claim 26 above, further comprising irradiating material in the region of said borehole with penetrating radiation capable of interacting with said material to induce said detected radiation.

* * * * *

UNITED STATES PATENT AND TRADEMARK OFFICE
CERTIFICATE OF CORRECTION

PATENT NO. : 4,883,956

DATED : November 28, 1989

INVENTOR(S) : Charles L. Melcher et al.

Page 1 of 2

It is certified that error appears in the above-identified patent and that said Letters Patent is hereby corrected as shown below:

On the title page, Item 54, AND Column 1, line 1, before "Gamma-Ray" insert -- BOREHOLE --;

Item 56, add to list of U.S. PATENT DOCUMENTS the following: -- 3,413,466 11/1968 Allen 250/267, -- 3,525,047 8/1970 Schwartz 328/114 --;

Column 1, 3rd liine from bottom, delete "F";

Item 56, add to list of FOREIGN PATENT DOCUMENTS the following: -- WO 85/00665 1/1985 PCT 1/164 - 1/202 --;

Column 2, last line, "9 Drawing Sheets" should read -- 8 Drawing Sheets --;

Column 2, line 9, "consequently" should read -- Consequently --;

Column 2, line 33, "ray of" should read -- ray or --;

Column 2, line 66, "(BFO)" should read -- (BGO) --;

Column 11, line 8, "8" should read -- 80 --;

UNITED STATES PATENT AND TRADEMARK OFFICE
CERTIFICATE OF CORRECTION

PATENT NO. : 4,883,956
DATED : November 28, 1989
INVENTOR(S) : Charles L. Melcher, et al.

It is certified that error appears in the above-identified patent and that said Letters Patent is hereby corrected as shown below:

Column 11, line 49, "pi+t 2" should read -- pi+t^2 --;

Column 11, line 52, "2" should read --^2 --;

Column 13, line 36, "extend" should read -- extent --;

Column 14, line 7, "claim 1" should read -- claim 2 --;

Column 14, line 20, "the" should read -- The --;

Column 15, line 15, "radiatin" should read -- radiation --.

Signed and Sealed this

Twelfth Day of February, 1991

Attest:

HARRY F. MANBECK, JR.

*Attesting Officer*  *Commissioner of Patents and Trademarks*